(12) United States Patent
Yui

(10) Patent No.: US 11,021,145 B2
(45) Date of Patent: Jun. 1, 2021

(54) CONTROL DEVICE FOR HYBRID VEHICLE

(71) Applicant: HONDA MOTOR CO., LTD., Tokyo (JP)

(72) Inventor: Naoki Yui, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 226 days.

(21) Appl. No.: 16/200,860

(22) Filed: Nov. 27, 2018

(65) Prior Publication Data

US 2019/0161069 A1 May 30, 2019

(30) Foreign Application Priority Data

Nov. 29, 2017 (JP) .............................. JP2017-229443

(51) Int. Cl.
| | |
|---|---|
| *B60W 20/14* | (2016.01) |
| *B60K 6/442* | (2007.10) |
| *B60L 7/10* | (2006.01) |
| *B60W 30/18* | (2012.01) |

(52) U.S. Cl.
CPC ............. *B60W 20/14* (2016.01); *B60K 6/442* (2013.01); *B60L 7/10* (2013.01); *B60W 30/18127* (2013.01); *B60W 2520/10* (2013.01); *B60W 2552/15* (2020.02); *B60W 2710/242* (2013.01); *B60Y 2200/92* (2013.01)

(58) Field of Classification Search
CPC ................................ B60W 20/14; B60K 6/442
See application file for complete search history.

(56) References Cited

U.S. PATENT DOCUMENTS

| | | | |
|---|---|---|---|
| 5,914,575 A * | 6/1999 | Sasaki | B60L 7/20 318/150 |
| RE39,023 E | 3/2006 | Sasaki | |
| RE39,205 E | 7/2006 | Sasaki | |
| 10,246,075 B2 * | 4/2019 | Morisaki | B60W 50/0097 |
| 2008/0314663 A1 | 12/2008 | Yamazaki et al. | |
| 2009/0145673 A1 | 6/2009 | Soliman et al. | |
| 2011/0160990 A1 * | 6/2011 | Mineta | G01C 21/3492 701/123 |
| 2013/0131901 A1 * | 5/2013 | Yamagata | B60W 30/18127 701/22 |

(Continued)

FOREIGN PATENT DOCUMENTS

| | | |
|---|---|---|
| EP | 1300273 A2 | 4/2003 |
| JP | H10-094107 A | 4/1998 |

(Continued)

*Primary Examiner* — Jess Whittington
(74) *Attorney, Agent, or Firm* — Paratus Law Group, PLLC

(57) ABSTRACT

A vehicle includes a first motor generator that generates electric power using power of an engine, a battery, and a second motor generator that is connected to drive wheels and is driven by electric power supplied from the battery and the first motor generator. An ECU of the vehicle drives the first motor generator as an electric motor with a regenerative electric power, executes a braking control, in which a load of the first motor generator functions as the engine, when an SOC is equal to or more than a threshold value of a waste electric-power start, and changes the threshold of the waste electric-power start based on a running condition of the hybrid vehicle.

5 Claims, 9 Drawing Sheets

(56) References Cited

U.S. PATENT DOCUMENTS

| | | | |
|---|---|---|---|
| 2015/0224981 A1 | 8/2015 | Fujishiro et al. | |
| 2016/0059844 A1* | 3/2016 | Ikedaya | B60K 6/387 701/22 |
| 2017/0282895 A1* | 10/2017 | Morisaki | B60W 10/06 |

FOREIGN PATENT DOCUMENTS

| | | |
|---|---|---|
| JP | 2003-116203 A | 4/2003 |
| JP | 2009-090735 A | 4/2009 |
| JP | 2011-183917 A | 9/2011 |
| JP | 2012-130213 A | 7/2012 |
| JP | 2015-013517 A | 1/2015 |
| WO | WO 2014/042007 A1 | 3/2014 |

* cited by examiner

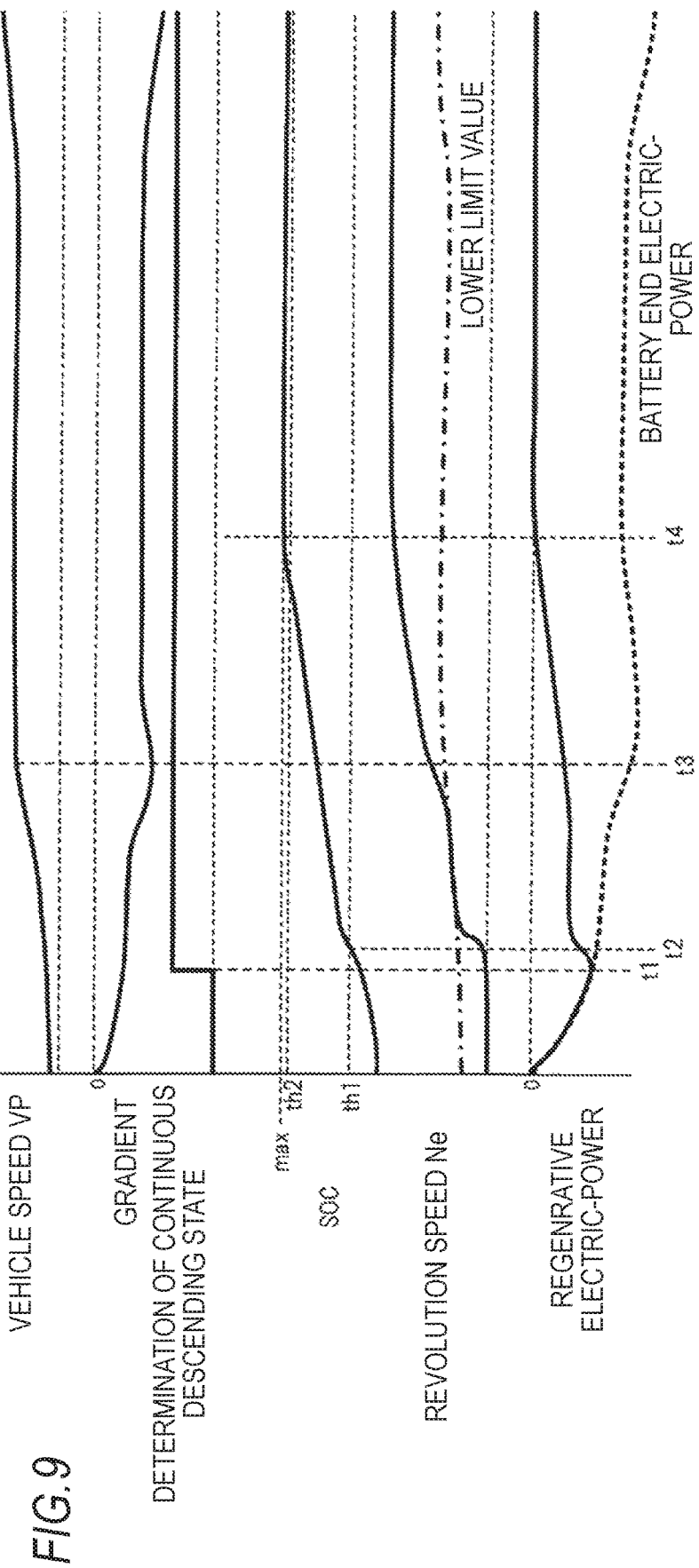

CONTROL DEVICE FOR HYBRID VEHICLE

CROSS-REFERENCE TO RELATED APPLICATIONS

The present application claims the benefit of priority of Japanese Patent Application No. 2017-229443, filed on Nov. 29, 2017, the content of which is incorporated herein by reference.

TECHNICAL FIELD

The present invention relates to a control device for a hybrid vehicle.

BACKGROUND ART

A hybrid vehicle is disclosed in JP-A-2003-116203 in which the motor operates as a generator during deceleration, energy is taken out as regenerative electric-power during deceleration, and a generator causes an engine during fuel cut to forcibly rotate when the regenerative electric-power is excessive, whereby the excess electric-power is consumed.

The consumption of the regenerative electric-power (hereinafter also referred to as waste electric-power control) due to the forced rotation of the engine as disclosed in JP-A-2003-116203 is not always performed during braking of a vehicle, but is necessary to appropriately perform according to the driving situation of the vehicle or the remaining capacity of the battery.

For example, it is desirable to prioritize a charge of a battery in consideration of fuel efficiency in urban areas where running is performed only by a motor. For this reason, it is better to prioritize the charge of the battery without performing the waste electric-power control as much as possible. On the other hand, the regenerative electric-power increases in mountain roads where downhill roads continue. Therefore, the waste electric-power may be actively performed in order to prevent overcharging of the battery and to ensure deceleration due to an engine brake.

In addition, when the remaining capacity of the battery is small, the charge of the battery should be prioritized over the waste electric-power control, but when the remaining capacity of the battery is large, the waste electric-power control may be prioritized.

In JP-A-2003-116203, a case of performing the waste electric-power control during deceleration is disclosed. However, it does not take into consideration that the waste electric-power control should start under which condition.

SUMMARY

The invention is to provide a control device for a hybrid vehicle capable of optimizing execution timing of control for discarding regenerative electric power during braking of the vehicle, thereby preventing overcharging of a battery during braking of the vehicle and achieving both securement of deceleration and improvement of fuel efficiency.

According to the invention, a control device for a hybrid vehicle including an internal combustion engine, a first motor generator that generates electric power using power of the internal combustion engine, a battery, and a second motor generator that is connected to drive wheels and is driven by electric power supplied from at least one of the battery and the first motor generator, the battery being chargeable with regenerative electric power obtained by operating the second motor generator as a generator during braking of the drive wheels, the control device being configured to: drive the first motor generator as an electric motor with the regenerative electric power; execute a braking control, in which a load of the first motor generator functions as the internal combustion engine, when a variable representing a state of charge of the battery according to high and low of a value is equal to or more than a predetermined value; and change the predetermined value based on a running condition of the hybrid vehicle.

Effects

According to the invention, it is possible to optimize execution timing of control for discarding regenerative electric power during braking of the vehicle, to prevent overcharging of a battery during braking of the vehicle, and to achieve securement of deceleration and improvement of fuel efficiency.

BRIEF DESCRIPTION OF THE DRAWINGS

FIG. 9 is a timing chart for describing a control of the vehicle during braking when the vehicle is shifted from a non-continuous descending state to a continuous descending state.

DETAILED DESCRIPTION OF EMBODIMENT

An embodiment of the invention will be described hereinafter with reference to the drawings.

A hybrid electrical vehicle (HEV) is equipped with a motor generator and an engine, and runs depending on a driving force of the motor generator and/or the engine according to a running condition of the vehicle.

The HEVs are roughly classified into two types; a series type HEV and a parallel type HEV. The series type HEV runs on the power of the motor generator. The engine is used mainly for generation of electric power, and electric power generated by the separate motor generator using the power of the engine is charged in a battery or supplied to the electric motor. The parallel type HEV runs on driving force of either or both of the motor generator and the engine.

An HEV is also known in which both the series type and the parallel type are switched.

In such a type of HEV, a clutch is engaged or disengaged (connected or disconnected) depending on running conditions of the vehicle, whereby a transmission system of driving force is switched to either of the series type and the parallel type. The transmission system of driving force may be switched by a power dividing mechanism using a planetary gear.

Figure 1:
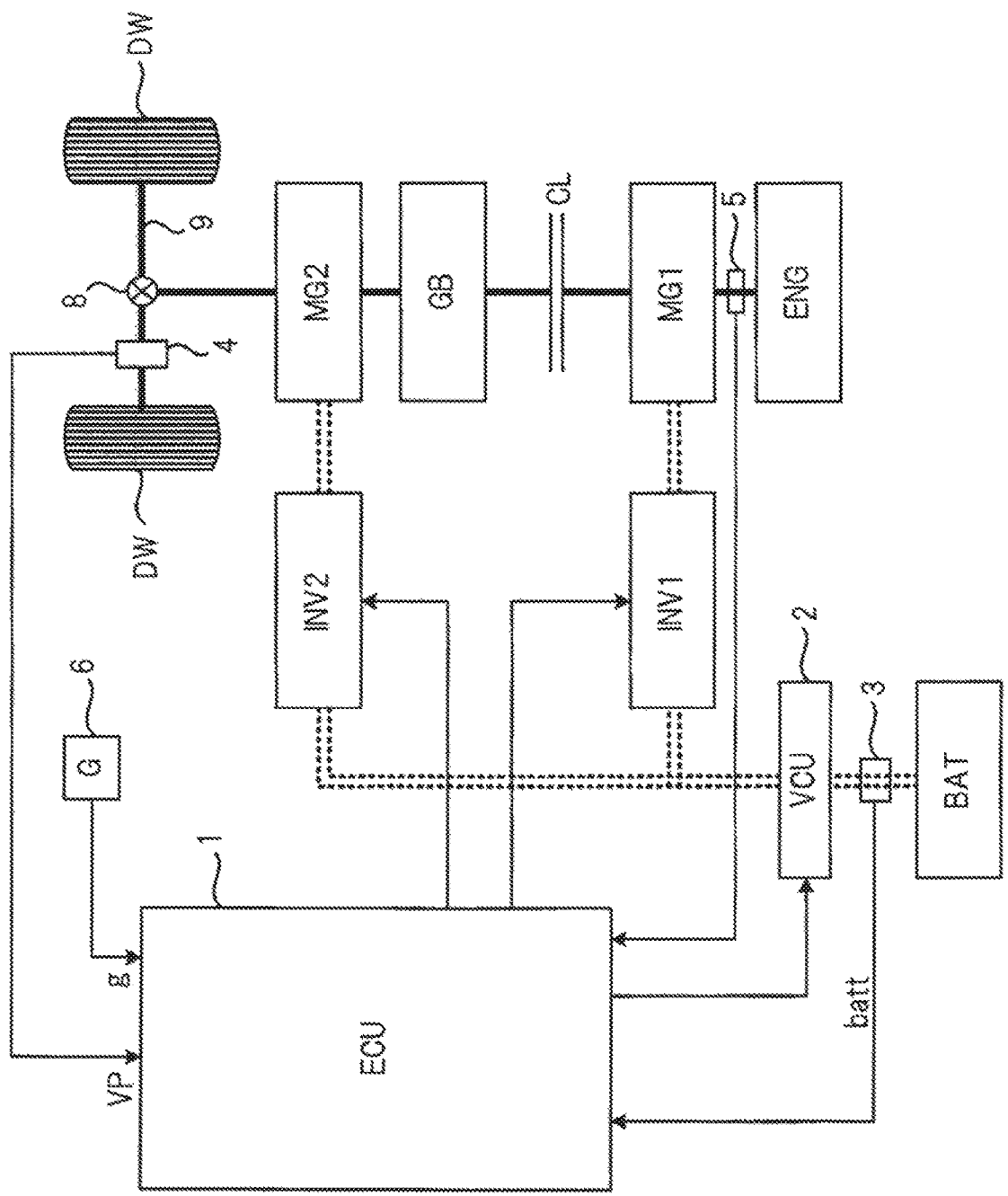
FIG. 1 is a block diagram illustrating an internal configuration of an HEV (vehicle) in which a series type and a parallel type can be switched.

FIG. 1 is a block diagram illustrating an internal configuration of an HEV in which a series type and a parallel type can be switched.

The HEV (hereinafter, simply referred to as "vehicle") illustrated in FIG. 1 includes an engine ENG which is an internal combustion engine, a first motor generator MG1, a second motor generator MG2, a lockup clutch (hereinafter, simply referred to as "clutch") CL, a gear box (hereinafter, simply referred to as "gear") GB, an acceleration sensor 6, a revolution speed sensor 5, a speed sensor 4, a battery sensor 3, a battery BAT, a voltage control unit (VCU) 2, a first inverter INV1, a second inverter INV2, an electronic control unit (ECU) 1, drive wheels DW and DW, a driving axle 9, and a differential gear 8. In FIG. 1, a thick solid line indicates a mechanical connection, a double dotted line indicates an electric power wiring, and a thin solid line indicates a control signal or a detection signal.

The engine ENG drives the first motor generator MG1 as a generator when the clutch CL is disengaged. The engine ENG can also function as a load of the first motor generator MG1 which operates as an electric motor, during braking of the vehicle.

However, when the clutch CL is engaged, the power output from the engine ENG is transmitted to the drive wheels DW and DW, as mechanical energy used for running the vehicle, via the first motor generator MG1, the clutch CL, the gear GB, the second motor generator MG2, the differential gear 8, and the driving axle 9.

The first motor generator MG1 is driven by the power of the engine ENG to generate electric power. In addition, the first motor generator MG1 can operate as an electric motor during the braking of the vehicle.

The second motor generator MG2 operates as an electric motor due to the supply of the power from at least one of the battery BAT and the first motor generator MG1, and generates power used for running the vehicle.

A torque generated by the second motor generator MG2 is transmitted to the drive wheels DW and DW via the differential gear 8 and the driving axle 9. Further, the second motor generator MG2 can operate as a generator during the braking of the vehicle.

The clutch CL engages or disengages (connects or disconnects) a power transmission line from the engine ENG to the drive wheels DW and DW depending on an instruction from the ECU 1. When the clutch CL is in the disengaged state, power output from the engine ENG is not transmitted to the drive wheels DW and DW. When the clutch CL is in the engaged state, the power output from the engine ENG is transmitted to the drive wheels DW and DW. The gear GB includes a shift stage or a fixed stage, shifts the power, which is output from the engine ENG, at a predetermined gear ratio, and transmits the shifted power to the drive wheel DW. The gear ratio in the gear GB is changed according to the instruction from the ECU 1.

The battery BAT includes a plurality of battery cells which are connected in series, for example, and supplies a high voltage of 100 to 200V, for example. The battery cells are, for example, lithium ion batteries or nickel-hydrogen batteries.

The speed sensor 4 detects a running speed (a vehicle speed VP) of the vehicle. A signal indicating the vehicle speed VP detected by the speed sensor 4 is sent to the ECU 1.

The battery sensor 3 detects the output (terminal voltage or charging and discharging currents) of the battery BAT. A signal indicating the terminal voltage or the charging and discharging currents detected by the battery sensor 3 is, as battery information batt, sent to the ECU 1.

The revolution speed sensor 5 detects a revolution speed Ne of the engine ENG. A signal indicating the revolution speed Ne detected by the revolution speed sensor 5 is sent to the ECU 1.

The acceleration sensor 6 detects acceleration g acting in a longitudinal direction of the vehicle. A signal indicating the acceleration g detected by the acceleration sensor 6 is sent to the ECU 1. The value of the acceleration g indicates a positive value when acceleration is applied in the front direction of the vehicle, and a negative value when acceleration is applied in the rear direction of the vehicle. Therefore, the value of the acceleration g detected on an uphill road is larger on the positive value side as the gradient of the uphill road becomes larger.

The VCU 2 steps up the output voltage of the battery BAT when the second motor generator MG2 operates as an electric motor. In addition, the VCU 2 steps down the output voltage of the second motor generator MG2 when the battery BAT is charged with the regenerative electric power generated by the second motor generator MG2 and converted into direct current during the braking of the vehicle. Moreover, the VCU 2 steps down the electric power generated by the first motor generator MG1 and converted into direct current by driving of the engine ENG. The electric power stepped down by the VCU 2 is charged in the battery BAT.

Figure 2:
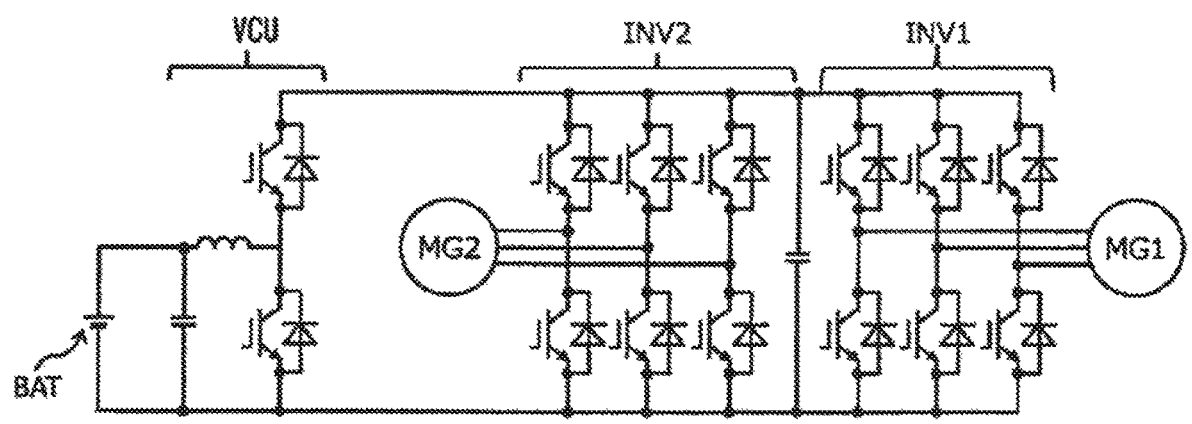
FIG. 2 is an electric circuit diagram illustrating a relationship between a battery, a VCU, a first inverter, a second inverter, a first motor generator, and a second motor generator which are illustrated in FIG. 1.

FIG. 2 is an electric circuit diagram illustrating a relationship between the battery BAT, the VCU 2, the first inverter INV1, the second inverter INV2, the first motor generator MG1, and the second motor generator MG2.

As illustrated in FIG. 2, the VCU 2 steps up a voltage on the output side to a voltage higher than an input voltage by on/off switching operation of two switching elements using a voltage output by the battery BAT as an input voltage. The voltage on the output side when two switching elements of the VCU 2 do not perform the on/off switching operation is equal to the input voltage.

The first inverter INV1 converts an AC voltage generated by the first motor generator MG1 due to the driving of the engine ENG into a DC voltage. In addition, the first inverter INV1 converts the DC voltage, which is generated by the second motor generator MG2 and converted by the second inverter INV2 during the braking of the vehicle, into an AC voltage, and supplies a three-phase current to the first motor generator MG1.

The second inverter INV2 converts an AC voltage into a DC voltage and supplies a three-phase current to the second motor generator MG2. In addition, the second inverter INV2 converts the AC voltage generated by the second motor generator MG2 during the braking of the vehicle into a DC voltage.

The ECU 1 comprehensively controls the entire vehicle, and includes various processors that execute programs and perform processes, a random access memory (RAM), and a read only memory (ROM).

Various processors include, for example, a central processing unit (CPU) which is a general-purpose processor executing programs and performing various processes, a programmable logic device (PLD) which is a processor whose circuit configuration can be changed after manufacturing a field programmable gate array (FPGA) and the like, or a dedicated electric circuit which is a processor having a circuit configuration dedicated for executing a specific process such as an application specific integrated circuit (ASIC).

More specifically, the structure of these various processors is an electric circuit in which circuit elements such as semiconductor elements are combined.

The processor of the ECU 1 may be constituted by one of various processors, or a combination of two or more of the same or different types of processors (for example, a combination of a plurality of FPGAs or a combination of CPU and FPGA).

The ECU 1 controls the first inverter INV1, the second inverter INV2, and the VCU 2 according to running conditions of the vehicle and a state of charge of the battery BAT, and performs braking control suitable for the running conditions of the vehicle and the state of charge of the battery BAT.

Figure 3:
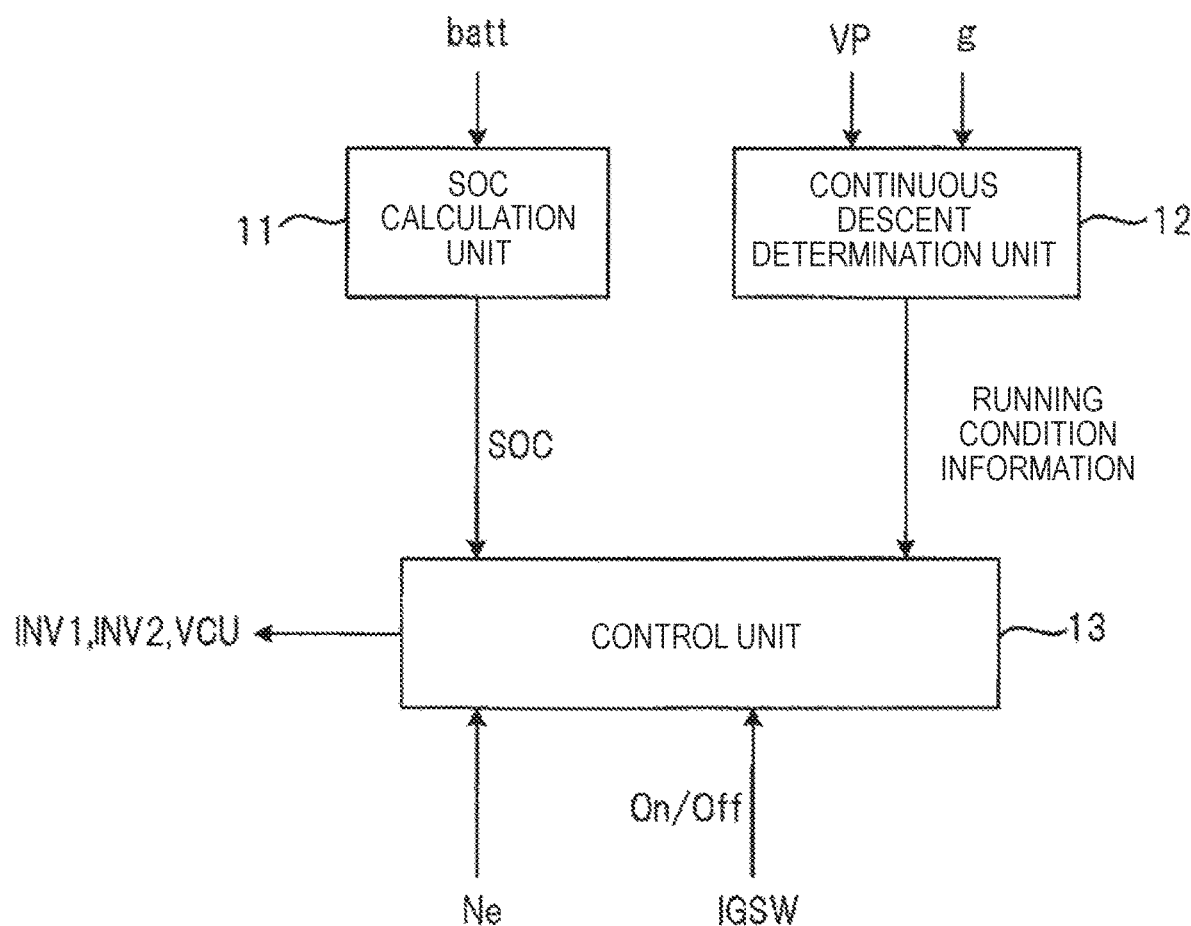
FIG. 3 is a functional block diagram of an ECU illustrated in FIG. 1.

FIG. 3 is a functional block diagram of the ECU 1 illustrated in FIG. 1. By executing programs, the processor of the ECU 1 functions as a control device of the vehicle including an SOC calculation unit 11, a continuous descent determining unit 12, and a control unit 13.

The SOC calculation unit 11 calculates, based on battery information batt obtained from the battery sensor 3, a state of charge (SOC) which is a variable representing the state of charge of the battery BAT according to high and low of the value.

The continuous descent determining unit 12 determines whether the vehicle is in a continuous descending state in which the vehicle continues to run on a downhill road.

The continuous descent determining unit 12 determines whether the vehicle is in the continuous descending state, based on the running distance of the vehicle calculated based on the vehicle speed VP obtained from the speed sensor 4 and the gradient of the downhill road calculated based on the acceleration g obtained from the acceleration sensor 6.

Figure 4:
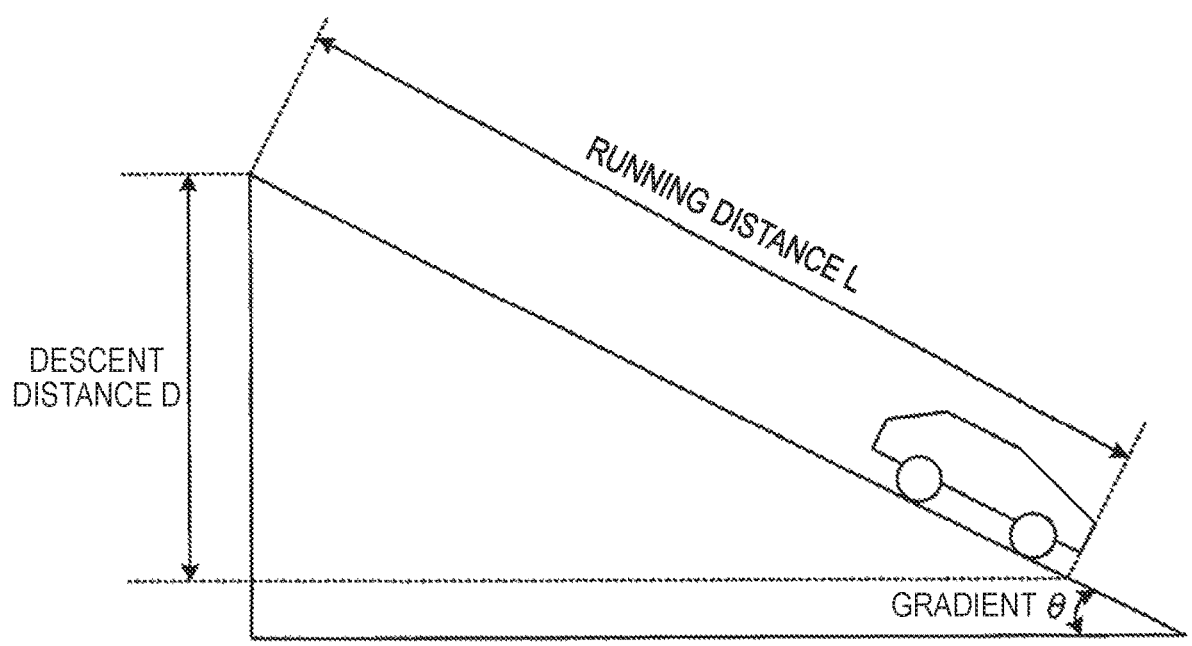
FIG. 4 is a schematic diagram for describing information used for determining a continuous descending state.

FIG. 4 is a schematic diagram for describing information used for determination of the continuous descending state. FIG. 4 illustrates a state in which the vehicle has come down the downhill road during a predetermined unit time. The running distance of the vehicle per unit time can be obtained from the product of the vehicle speed VP and the unit time. The running distance can also be obtained by information received from a global positioning system (GPS) mounted on the vehicle.

The continuous descent determining unit 12 calculates a descent distance D of the vehicle per unit time illustrated in FIG. 4 from calculation of the following Equation (1) including an average gradient θ of the downhill road per unit time calculated based on the acceleration g of the vehicle and the running distance of the vehicle in the unit time.

$$D = L \times \sin\theta \quad (1)$$

The continuous descent determining unit 12 integrates the descent distance D calculated by Equation (1) by a predetermined determined reference time. The continuous descent determining unit 12 determines that the vehicle is in the continuous descending state when the resultant integrated value is equal to or more than a predetermined determination reference value, and determines that the vehicle is not in the continuous descending state when the integrated value is less than the determination reference value.

The continuous descent determining unit 12 may calculate a descending speed of the vehicle by multiplying the vehicle speed VP obtained from the speed sensor 4 by sin θ, and calculate the descent distance D per unit time from the descending speed.

The method of determining the continuous descending state is not limited to one described above. For example, the continuous descent determining unit 12 calculates a change amount of the vehicle height per unit time according to information from the GPS receiver, and may determine that the vehicle is in the continuous descending state when the decrease amount of the vehicle height at the determination reference time exceeds a threshold value.

Alternatively, the continuous descent determining unit 12 acquires a signal indicating an accelerator pedal opening of the vehicle, and may determine that the vehicle is in the continuous descending state when the accelerator pedal opening is zero and the vehicle speed VP is continually equal to or greater than a predetermined value for a predetermined time or more.

The continuous descent determining unit 12 inputs running condition information indicating that the vehicle is in the continuous descending state to the control unit 13 when determining that the vehicle is in the continuous descending state, whereas the continuous descent determining unit 12 inputs running condition information indicating that the vehicle is in the non-continuous descending state to the control unit 13 when determining that the vehicle is not in the continuous descending state.

Based on the SOC calculated by the SOC calculation unit 11 and the running condition information input from the continuous descent determining unit 12, the control unit 13 selects a type of the braking control to be performed during the braking of the vehicle, and controls at least one of the first inverter INV1, the second inverter INV2, and the VCU 2 according to the selected braking control.

Figure 5:
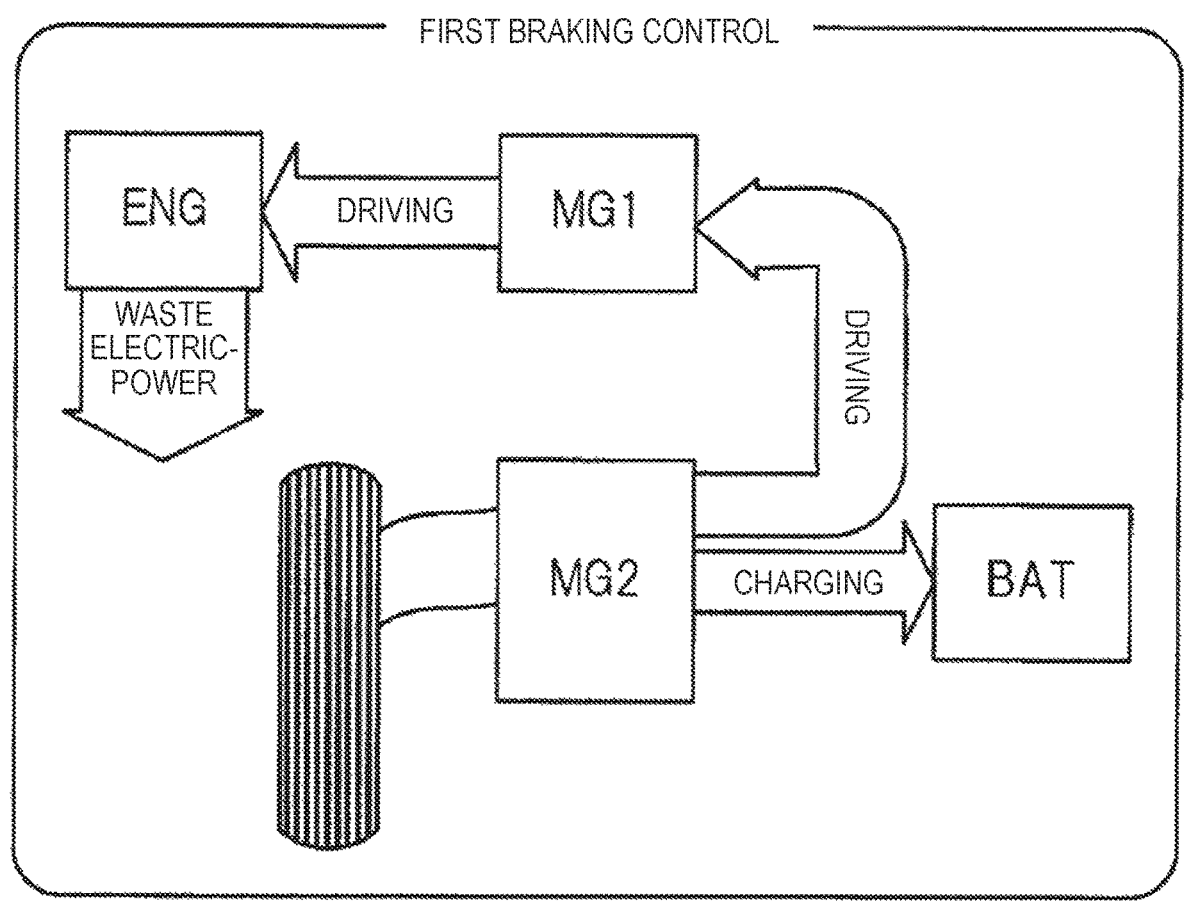
FIG. 5 is an explanatory diagram illustrating a flow of energy during a first braking control.
Figure 6:
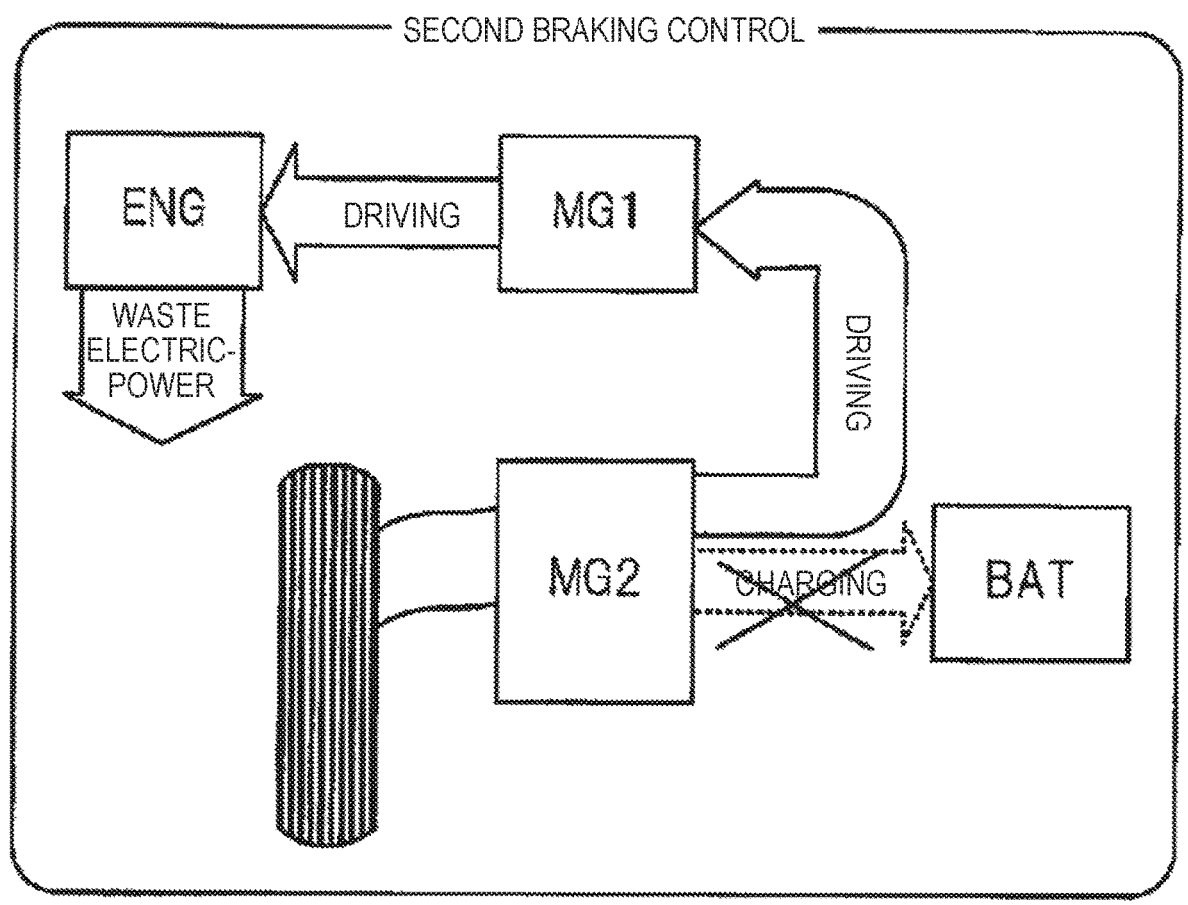
FIG. 6 is an explanatory diagram illustrating a flow of energy during a second braking control.
Figure 7:
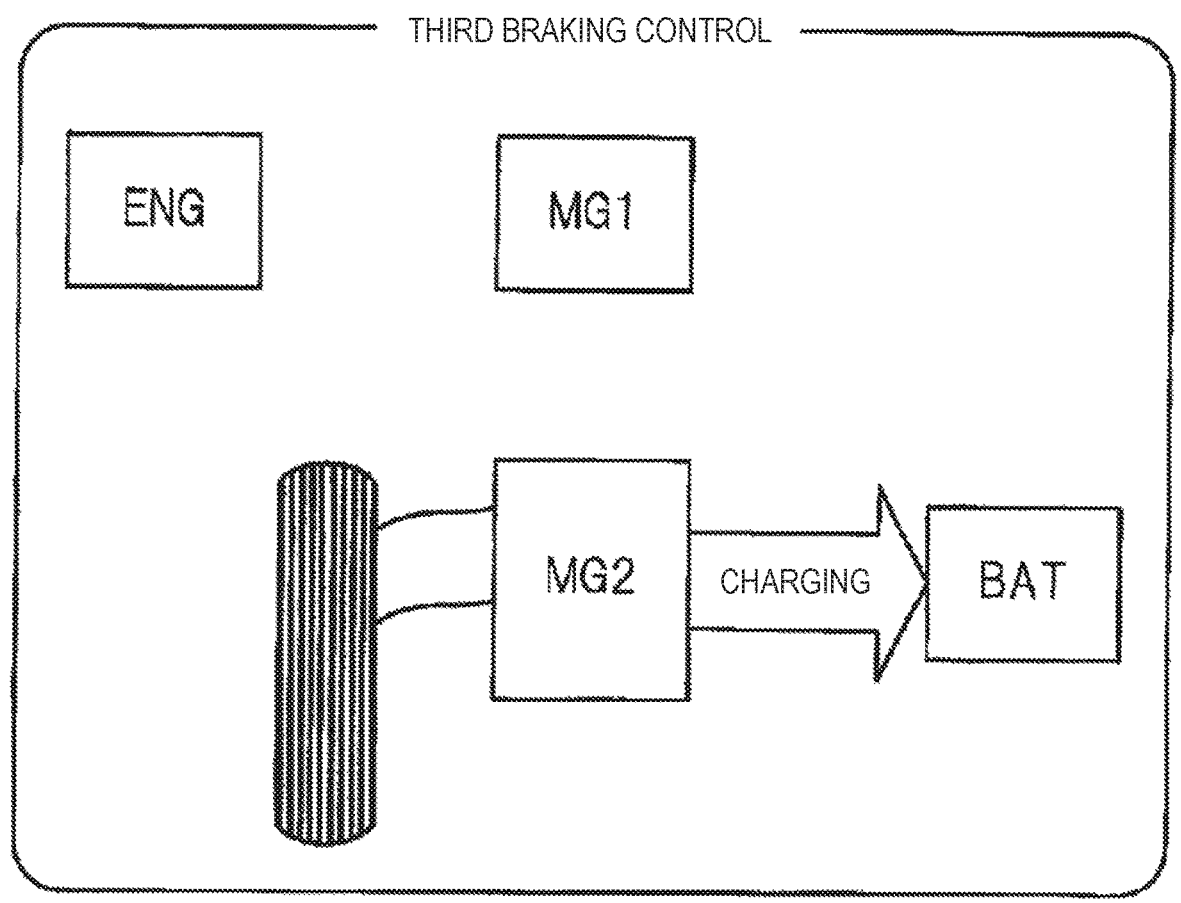
FIG. 7 is an explanatory diagram illustrating a flow of energy during a third braking control.

Three types of braking controls can be selected by the control unit 13 during the braking of the vehicle. FIGS. 5 to 7 illustrate states of the three braking controls, respectively. FIG. 5 is an explanatory diagram illustrating a flow of energy during a first braking control. FIG. 6 is an explanatory diagram illustrating a flow of energy during a second braking control. FIG. 7 is an explanatory diagram illustrating a flow of energy during a third braking control.

In the first braking control illustrated in FIG. 5, the second motor generator MG2 operates as a generator due to the braking force of the vehicle, and a part of the regenerative electric power generated by the second motor generator MG2 is charged in the battery BAT. Further, the rest of the regenerative electric power generated by the second motor generator MG2 is used for driving the first motor generator MG1, and the engine ENG is driven via the first motor generator MG1. At this time, the engine ENG functions as a load of the first motor generator MG1.

In the following description, the amount of electric power used for driving the first motor generator MG1 among the regenerative electric power generated by the second motor generator MG2 during the first braking control is referred to as a waste electric-power, and the amount of electric power used for charging the battery BAT among the regenerative electric power is referred to as a charging electric-power amount.

In the second braking control illustrated in FIG. 6, the second motor generator MG2 operates as a generator due to the braking force of the vehicle. The regenerative electric power generated by the second motor generator MG2 is not charged in the battery BAT but is used only for driving the first motor generator MG1, and the engine ENG is driven via the first motor generator MG1. At this time, the engine ENG functions as a load of the first motor generator MG1.

In the third braking control illustrated in FIG. 7, the second motor generator MG2 operates as a generator due to the braking force of the vehicle, and all the regenerative electric power generated by the second motor generator MG2 is charged in the battery BAT.

In braking of the vehicle, when the SOC calculated by the SOC calculation unit 11 reaches a predetermined waste electric-power start threshold or becomes more, the control unit 13 selects the first braking control or the second braking control. When the SOC calculated by the SOC calculation unit 11 is less than the predetermined waste electric-power start threshold, the control unit 13 selects the third braking control.

When the first braking control is selected, the control unit 13 controls ratio of waste electric-power amount (hereafter referred to as waste electric-power ratio) which is occupied by the regenerative electric power generated by the second motor generator MG2, based on the SOC calculated by the SOC calculation unit 11 and the vehicle speed VP (running speed) of vehicle earned by the speed sensor 4.

Specifically, when the first braking control is executed, the control unit 13 controls the waste electric-power ratio such that a rising speed of the SOC calculated by the SOC calculation unit 11 reaches a predetermined speed threshold or becomes less to protect the battery BAT based on the SOC and the vehicle speed VP.

For example, as a target value of the SOC after a predetermined time passed from an arbitrary point of time is set, the regenerative electric power amount that becomes the waste electric-power amount in the regenerative electric power amount earned from the vehicle speed VP at this point of time to achieve the target value within the predetermined time is decided. Therefore, the waste electric-power ratio regarding a combination of the SOC and the vehicle speed VP can be predetermined according to the rising speed of the SOC which needs to be realized.

However, the regenerative electric power which is generated by the second motor generator MG2 during braking of the vehicle becomes larger as the vehicle speed VP of the vehicle becomes higher. For example, when the SOC is low and the vehicle speed VP is high, if the waste electric-power ratio becomes too low according to the SOC, the charging electric power amount increases too much. Considering protection of the battery BAT, it is effective to increase or decrease the waste electric-power ratio decided according to the SOC along with the vehicle speed VP.

In the ROM of the ECU 1, data in which the waste electric-power ratio is associated with every combination possible of the SOC and the vehicle speed VP is stored. The data is set such that the waste electric-power ratio becomes larger proportionally to the SOC, and the proportional coefficient becomes larger as the vehicle speed VP becomes higher.

In the ROM of the ECU 1, a lower limit value of the revolution speed Ne associated with a possible value of the vehicle speed VP is stored. The lower limit value of the revolution speed Ne is set to be larger as the associated vehicle speed VP is larger. The lower limit value is set to be smaller than the revolution speed Ne when the waste electric-power ratio is 100% while the associated vehicle speed VP, and set to be larger than the revolution speed Ne during idling.

When the first braking control is executed, the control unit 13 reads, from the ROM, the waste electric-power ratio associated with the combination of the SOC calculated by the SOC calculation unit 11 and the vehicle speed VP earned from the speed sensor 4 and the lower limit value of the revolution speed Ne associated with the vehicle speed VP earned from the speed sensor 4.

The control unit 13 calculates a target revolution speed of the engine ENG according to the earned regenerative electric power amount and the waste electric-power ratio read from the ROM and compares the calculated target revolution speed with the lower limit value of the revolution speed Ne read from the ROM.

When the target revolution speed is equal to or higher than the mentioned lower limit value, the control unit 13 controls the waste electric-power amount such that the revolution speed Ne reaches the target revolution speed.

When the target revolution speed is lower than the mentioned lower limit value, the control unit 13 changes the target revolution speed to the lower limit value and controls the waste electric-power amount such that the revolution speed Ne reaches the target revolution speed.

During real driving of the vehicle, the vehicle speed VP may delicately fluctuate according to gear shifting or the like. Therefore, by controlling the revolution speed of the engine ENG according to the waste electric-power ratio stored in the ROM, fluctuation of the revolution speed of the engine ENG may become large.

In such case, the control unit 13 controls, as described above, the revolution speed Ne of the engine ENG such that the revolution speed Ne does not go below the lower limit value associated with the vehicle speed VP during the first braking control. By doing so, the fluctuation of the revolution speed of the engine ENG decreases in predetermined cases of the waste electric-power ratio becoming smaller (cases of the SOC becomes lower).

Figure 8:
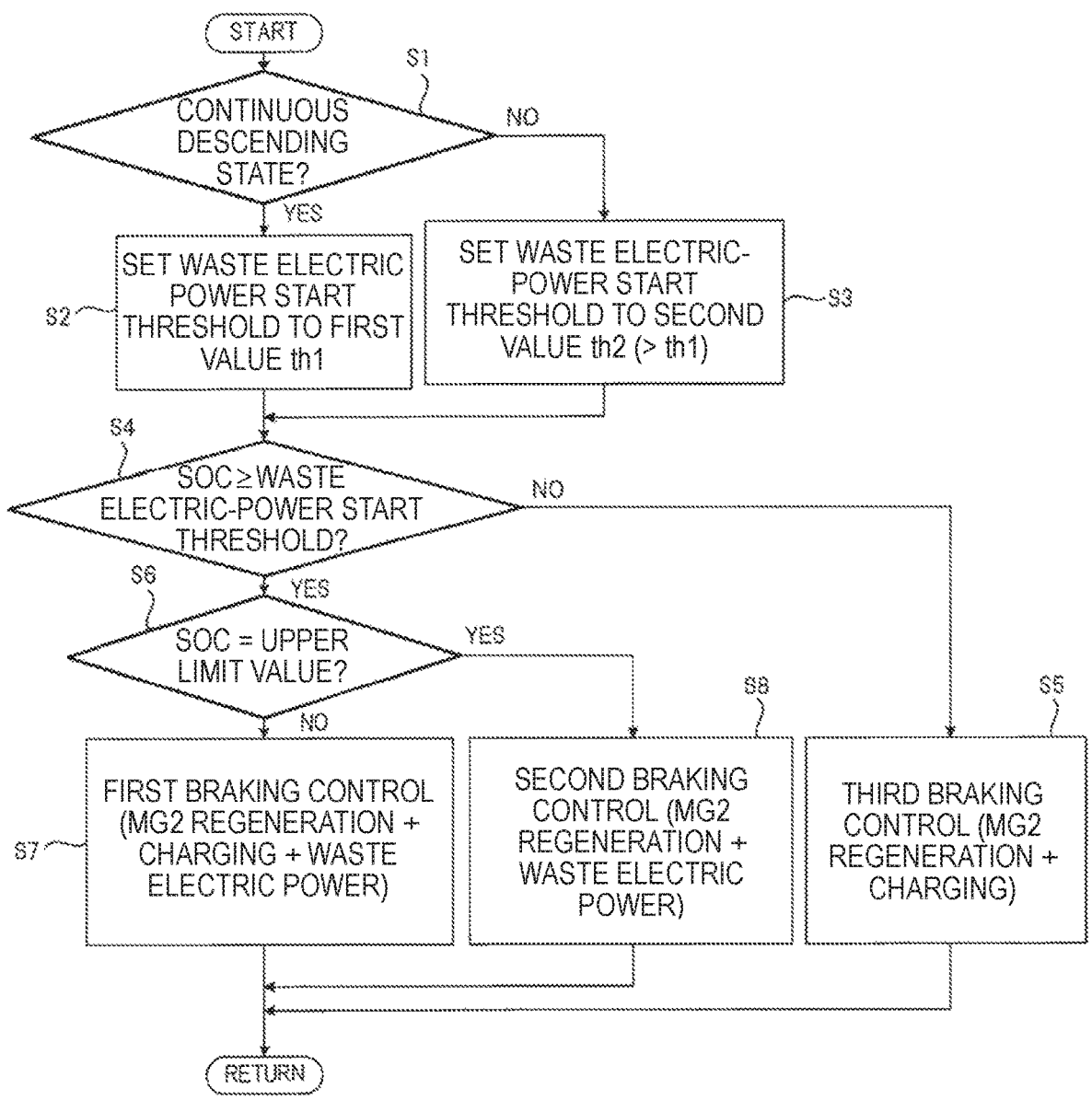
FIG. 8 is a flowchart illustrating a flow of processing to be performed when a control unit selects a braking control after a vehicle is activated.

FIG. 8 is a flowchart illustrating a flow of the process of the control unit 13 when selecting braking control after start of the vehicle.

First, the control unit 13 determines whether the running condition information input from the continuous descent determining unit 12 indicates continuous descending state (step S1).

When the continuous descent determining unit 12 indicates continuous descending state (YES in step S1), the control unit 13 sets the waste electric-power start threshold as a first value th1 (step S2). When the continuous descent determining unit 12 indicates non-continuous descending state (NO in step S1), the control unit 13 sets the waste electric-power start threshold as a second value th2 which is larger than the first value th1 (step S3).

After step S2 or step S3, the control unit 13 determines whether the SOC of the battery BAT calculated by the SOC calculation unit 11 is equal to or larger than the waste electric-power start threshold set during step S2 or step S3 (step S4).

When the SOC is lower than the waste electric-power start threshold (NO in step S4), the control unit 13 selects the third braking control illustrated in FIG. 7 and controls the first inverter INV1, the second inverter INV2, and VCU 2 according to the third braking control (step S5).

On the other hand, when the SOC is equal to or larger than the waste electric-power start threshold (YES in step S4), the control unit 13 determines whether the SOC reached the predetermined upper limit value (a value equal to or higher than the second value th2) or not (step S6).

When the SOC did not reach the upper limit value (NO in step S6), the control unit 13 selects the first braking control illustrated in FIG. 5 and controls the first inverter INV1, the second inverter INV2, and VCU 2 according to the first braking control (step S7).

In step S7, the control unit 13 controls the waste electric-power amount in the regeneration electric power generated by the second motor generator MG2 such that the rising speed of the SOC is equal to or less than the speed threshold based on the SOC and the vehicle speed VP.

When executing the first braking control, assuming that the running speed of the vehicle is constant (the regenerative electric power is constant), at an initial state of charging start of the battery BAT by the regenerative electric power, control is done such that the revolution speed Ne of the engine ENG is low. Along progress of charging of the batter BAT, electric power amount distributed to the engine ENG increases, and the revolution speed Ne of the engine ENG becomes larger.

In step S6, when the SOC reached the upper limit value (YES in step S6), the control unit 13 selects the second braking control illustrated in FIG. 6, and controls the first inverter INV1, the second inverter INV2, and VCU 2 according to the second braking control (step S8). Then, the above operations are repeated.

FIG. 9 is a timing chart for explaining control contents during braking when the vehicle moved on from the non-continuous descending state to the continuous descending state.

In a time t1, as the running condition information changes from information indicating non-continuous descending state to information indicating continuous descending state, the control unit 13 changes the waste electric-power start threshold from the second value th2 to the first value th1. The term "max" in FIG. 9 indicates the above-mentioned upper limit value of the SOC.

At the point of the time t1, since the SOC is lower than the first value th1, the control unit 13 selects and executes the third braking control for the regenerative electric power to be all used for charging the battery BAT.

As the charging of the battery BAT progresses by the third braking control and the SOC reaches the first value th1 in a time t2, the control unit 13 selects and executes the first braking control. Therefore, the revolution speed Ne of the engine ENG increases, and simultaneously, the SOC starts increasing.

In the example of FIG. 9, during between the time t2 and a time t3 which the SOC is low, the waste electric-power ratio is controlled to be low according to the data of the ROM, but the revolution speed Ne of the engine ENG is controlled to not reach below the lower limit value (a waveform illustrated as a dashed line in the drawing) associated with the vehicle speed VP. Therefore, along restraining the fluctuation of the revolution speed Ne, overcharging of the battery BAT is also prevented.

In the time t3 after the time t2, as the vehicle speed VP becomes constant, the revolution speed Ne of the engine ENG increases along with the increase of the SOC. In time t4, when the SOC reaches the upper limit value, the control unit 13 selects and executes the second braking control. Therefore, the regenerative electric power is all used for revolving the engine ENG.

As described above, according to the vehicle illustrated in FIG. 1, the start condition of the first braking control and the second braking control is changed according to the running condition of the vehicle. For this reason, the first braking control and the second braking control may start at an optimal timing in consideration of the state of charge of the battery BAT and the running condition of the vehicle. It is possible to prevent the overcharging of the battery BAT and to achieve both securement of deceleration and improvement of fuel efficiency.

In the vehicle illustrated in FIG. 1, when it is determined that the vehicle is in the continuous descending state, the waste electric-power start threshold is set to be a relatively lower value. That is, the first braking control or the second braking control can be executed earlier in the continuous descending state, compared with a case where the vehicle runs on the flat road which is not in the continuous descending state.

Therefore, deceleration is sufficiently secured during running on a downhill road, and simultaneously, overcharging of the battery BAT is prevented. On the other hand, in the non-continuous descending state, since the third braking control becomes easy to execute such that charging of the battery BAT can be a prioritized, it is possible to improve fuel efficiency.

In the vehicle illustrated in FIG. 1, during the first braking control, the waste electric-power ratio is controlled based on the SOC and the vehicle speed VP. Therefore, charging speed of the battery BAT can be gentle and durability of the battery BAT can be secured.

In the vehicle illustrated in FIG. 1, during the first braking control, for example, when the vehicle speed VP is constant, the waste electric-power ratio increases as the battery BAT approaches full charging. When the waste electric-power start threshold is set to the first value th1, the vehicle is running on the downhill road for a long time, therefore the revolution speed Ne of the engine ENG becomes extremely low during braking. In such state, when the first braking control starts, the revolution speed Ne of the engine ENG is controlled to be low during start of the first braking control, and thus it is possible to prevent great change in the revolution speed Ne. Therefore, the ride comfort of the vehicle is improved.

When the waste electric-power start threshold is set to the second value th2, for example, the vehicle is running on the flat road, and in most cases, the revolution speed Ne of the engine ENG is high from the start. Thus, even when the first braking control or the second braking control starts, there is no great change in the revolution speed Ne of the engine ENG.

In the vehicle illustrated in FIG. 1, during the first braking control, the revolution speed Ne of the engine ENG is controlled to be equal to or higher than the lower limit value of the revolution speed Ne set in proportion to the vehicle speed VP. Thus, by preventing the fluctuation of the revolution speed of the engine ENG in a start early stage of the first braking control when the waste electric-power start threshold is set to the first value th1, the comfort of driving is improved. Since the lower limit value is set to be larger as the vehicle speed VP is larger, it is possible to sufficiently secure waste electric-power amount during fast running where the regenerative electric power increases. Thus, it is possible to secure the prevention of the overcharging of the battery BAT and deceleration by engine brake. Control of the lower limit value of the revolution speed Ne in the first braking control described above is not essential. In a case where the control is omitted, control of the waste electric-power amount may be executed according to the waste electric-power ratio stored in the ROM.

The present invention is not limited to the embodiment described above and can be appropriately modified and improved.

For example, when the control unit 13 executes the first braking control, the waste electric-power ratio may be controlled based on only the SOC. Specifically, the control unit 13 during the first braking control sets the waste electric-power ratio to be larger as the SOC is larger.

According to such configuration, as the regenerative electric power regenerated by the battery BAT decreases as the charge of the battery BAT advances, the charging remaining amount of the battery BAT is loosely increased and it is possible to protect the battery BAT.

According to such configuration, when the first braking control starts in the state where the waste electric-power start threshold is set to the first value th1, the revolution speed Ne of the engine ENG during start of the first braking control is controlled to be low. Thus, it is possible to prevent large change in the revolution speed Ne and improve the ride comfort of the vehicle.

When the control unit 13 executes the first braking control, the waste electric-power ratio may be controlled based on only the vehicle speed VP. Specifically, the control unit 13 during the first braking control sets the waste electric-power ratio to be larger as the vehicle speed VP is larger.

According to such configuration, as the regenerative electric power regenerated by the battery BAT decreases along with the increase of the vehicle speed VP (increase of the regenerative electric power), the charging remaining amount of the battery BAT is loosely increased. Therefore, it is possible to protect the battery BAT.

According to such configuration, when the first braking control starts in the continuous descending state, that is, a state of high vehicle speed VP, change of the revolution speed Ne of the engine ENG becomes larger. However, road noise is larger as the vehicle speed VP is higher. Thus, it is possible to prevent ride comfort from deteriorating due to the change of the revolution speed Ne. On the other hand, if the vehicle speed VP is low when the first braking control starts, the road noise becomes small. However, as the change of the revolution speed Ne is small too, there is no influence on the ride comfort of the vehicle.

In FIG. 8, step S6 and step S7 may be deleted and the process may be configured to execute step S8 when the determination of step S4 is YES.

According to such configuration, in the continuous descending state, the second braking control becomes easier to execute than the third braking control. Thus, it is possible to secure the prevention of the overcharging of the battery BAT and the deceleration by the engine brake.

On the other hand, in the non-continuous descending state, the third braking control becomes easier to execute than the second braking control. Thus, in city areas or the like where there are lots of cases of running the vehicle by only electric-power supply from the battery BAT, it is possible to efficiently charge the battery BAT and improve fuel efficiency of the vehicle.

The vehicle described above is not limited to HEV which is switchable between series type and parallel type, but may be series type HEV or parallel type HEV.

As described above, the description discloses the follows configurations.

(1) A control device (e.g., the ECU 1 in the embodiment to be described above) for a hybrid vehicle including an internal combustion engine (e.g., the engine ENG in the embodiment to be described above), a first motor generator (e.g., the first motor generator MG1 in the embodiment to be described above) that generates electric power using power of the internal combustion engine, a battery (e.g., the battery BAT in the embodiment to be described above), and a second motor generator (e.g., the second motor generator MG2 in the embodiment to be described above) that is connected to drive wheels (e.g., the drive wheels DW in the embodiment to be described above) and is driven by electric power supplied from at least one of the battery and the first motor generator, the battery being chargeable with regenerative electric power obtained by operating the second motor generator as a generator during braking of the drive wheels, the control device being configured to: drive the first motor generator as an electric motor with the regenerative electric power; execute a braking control, in which a load of the first motor generator functions as the internal combustion engine, when a variable (e.g., the SOC in the embodiment to be described above) representing a state of charge of the battery according to high and low of a value is equal to or more than a predetermined value; and change the predetermined value based on a running condition of the hybrid vehicle.

According to configuration (1), the start condition of the braking control is changed according to the running conditions of the hybrid vehicle. For this reason, it is possible to start the braking control at an optimal timing in consideration of the state of charge of the battery and the running conditions of the hybrid vehicle, to prevent the overcharging of the battery, and to achieve both the securement of deceleration and improvement of fuel efficiency during braking of the vehicle.

(2) The control device for a hybrid vehicle according to configuration (1), wherein the control device determines whether the hybrid vehicle is in a continuous descending state in which the vehicle continues to run on a downhill road, and sets the predetermined value to a smaller value in a case of determining that the vehicle is in the continuous descending state rather than in a case of determining that the vehicle is not in the continuous descending state.

According to configuration (2), the braking control is executed earlier in the continuous descending state, compared with a case where the vehicle runs on the flat road which is not in the continuous descending state. For this reason, during running on the downhill road, sufficient deceleration can be secured and overcharging of the battery can be prevented. On the other hand, for example, when the vehicle runs on the flat road, the charge of the battery can be prioritized and fuel efficiency can be improved.

(3) The control device for a hybrid vehicle according to configuration (2), wherein the braking control includes a first braking control of performing both a charge of the battery with the regenerative electric power and a drive of the first motor generator with the regenerative electric power and a second braking control of performing only the drive of the first motor generator with the regenerative electric power, and an amount of the regenerative electric power used for the drive of the first motor generator is controlled, based on the variable, during the first braking control.

According to configuration (3), it is possible to change the amount of electric power used for the rotation of the internal combustion engine according to the state of charge of the battery. Therefore, it is possible to optimize the balance between the operation noise of the internal combustion engine and the load applied to the battery during the braking control. Accordingly, comfort during the driving of the hybrid vehicle and durability of the battery can be secured.

(4) The control device for a hybrid vehicle according to configuration (3), wherein during the first braking control, the amount of the regenerative electric power used for the drive of the first motor generator increases as the variable is higher.

According to configuration (4), as the battery approaches the full charge, the amount of the regenerative electric power to be turned to the rotation of the internal combustion engine increases. Therefore, it is possible to gradually advance the charge of the battery and to secure durability of the battery. Further, for example, when the first braking control is started in a state where the predetermined value is relatively small and under the running condition in which no fuel is supplied to the internal combustion engine, the revolution speed of the internal combustion engine can be prevented from suddenly increasing. Accordingly, the ride comfort of the hybrid vehicle can be improved.

(5) The control device for a hybrid vehicle according to configuration (2), wherein the braking control includes a first braking control of performing both a charge of the battery with the regenerative electric power and a drive of the first motor generator with the regenerative electric power and a second braking control of performing only the drive of the first motor generator with the regenerative electric power, and an amount of the regenerative electric power used for the drive of the first motor generator is controlled, based on a running speed of the hybrid vehicle, during the first braking control.

According to configuration (5), it is possible to change the amount of electric power used for the rotation of the internal combustion engine according to the running speed. Therefore, it is possible to optimize the balance between the operation noise of the internal combustion engine and the load applied to the battery during the braking control. Accordingly, comfort during the driving of the hybrid vehicle and durability of the battery can be secured.

(6) The control device for a hybrid vehicle according to configuration (5), wherein during the first braking control, the amount of the regenerative electric power used for the drive of the first motor generator increases as the running speed is higher.

According to configuration (6), as the running speed increases, the amount of the regenerative electric power to be turned to the rotation of the internal combustion engine increases. Therefore, it is possible to prevent the electric power from being excessively supplied to the battery, to suppress the charging speed of the battery, and to secure durability of the battery. In addition, for example, when the first braking control is started under the running condition in which the running speed is low and no fuel is supplied to the internal combustion engine, the revolution speed of the internal combustion engine can be prevented from suddenly increasing. When the first braking control is started under the running condition in which the running speed is high and fuel is supplied to the internal combustion engine, road noise occurs due to a high constant speed, so that it is possible to prevent the deterioration of the ride comfort due to sudden increase in the revolution speed of the internal combustion engine.

(7) The control device for a hybrid vehicle according to configuration (2), wherein the braking control includes a first braking control of performing both a charge of the battery with the regenerative electric power and a drive of the first motor generator with the regenerative electric power and a second braking control of performing only the drive of the first motor generator with the regenerative electric power, and an amount of the regenerative electric power used for the drive of the first motor generator is controlled, based on the variable and the running speed of the hybrid vehicle, during the first braking control.

According to configuration (7), it is possible to change the amount of electric power used for the rotation of the internal combustion engine according to the state of charge of the battery and the running speed. Therefore, it is possible to optimize the balance between the operation noise of the internal combustion engine and the load applied to the battery during the braking control. Accordingly, comfort during the driving of the hybrid vehicle and durability of the battery can be secured.

(8) The control device for a hybrid vehicle according to configuration (7), wherein the control device calculates a revolution speed of the internal combustion engine, during the first braking control, based on the variable and the running speed, controls the amount of the regenerative electric power used for the first motor generator so as to be the calculated revolution speed when the calculated revolution speed is equal to or more than a lower limit value of the revolution speed set in advance according to the running speed, and controls the amount of the regenerative electric power used for the first motor generator so as to be the lower limit value of the revolution speed when the calculated revolution speed is less than the lower limit value, and the lower limit value is set to a larger value as the running speed is higher.

According to configuration (8), it is possible to reduce the load on the battery by controlling the amount of electric power used for the rotation of the internal combustion engine based on the variable and the running speed so as not to increase the charging speed of the battery. In addition, when the variable is small, it is possible to reduce the operation noise of the internal combustion engine when the firsts braking control is started by reducing the amount of electric power used for the rotation of the internal combustion engine, whereby the comfort can be improved during driving. Further, when the revolution speed is controlled to be equal to or more than the lower limit value corresponding to the running speed, fluctuation of the revolution speed can be prevented and the comfort can be improved during driving. In addition, the electric power is prevented from being excessively supplied to the battery, whereby protection of the battery and securement of the braking force due to the internal combustion engine can be realized.

(9) The control device for a hybrid vehicle according to any one of configurations (2) to (8), wherein the control device determines whether the vehicle is in the continuous descending state based on a running distance of the hybrid vehicle and a gradient of a downhill road on which the hybrid vehicle is running.

According to configuration (9), it is possible to easily determine whether the vehicle is in the continuous descending state.

(10) The control device for a hybrid vehicle according to any one of configurations (2) to (8), wherein the control device determines whether the vehicle is in the continuous descending state based on the running speed of the hybrid vehicle and a gradient of a downhill road on which the hybrid vehicle is running.

According to configuration (10), it is possible to easily determine whether the vehicle is in the continuous descending state.

The invention claimed is:

1. A control device for a hybrid vehicle including an internal combustion engine, a first motor generator that generates electric power using power of the internal combustion engine, a battery, and a second motor generator that is connected to drive wheels and is driven by electric power supplied from at least one of the battery and the first motor generator, the battery being chargeable with regenerative electric power obtained by operating the second motor generator as a generator during braking of the drive wheels, the control device being configured to:
drive the first motor generator as an electric motor with the regenerative electric power;
execute a braking control, in which the internal combustion engine functions as a load of the first motor generator, when a variable representing a state of charge of the battery according to high and low of a value is equal to or more than a predetermined value; and
change the predetermined value based on a running condition of the hybrid vehicle, wherein
the braking control includes a first braking control of performing both a charge of the battery with the regenerative electric power and a drive of the first motor generator with the regenerative electric power and a second braking control of performing only the drive of the first motor generator with the regenerative electric power, and
an amount of the regenerative electric power used for the drive of the first motor generator is controlled, based on a running speed of the hybrid vehicle, during the first braking control.

2. The control device according to claim 1, wherein the control device determines whether the hybrid vehicle is in a continuous descending state in which the vehicle continues to run a downhill road, and sets the predetermined value to a smaller value in a case of determining that the vehicle is in the continuous descending state rather than in a case of determining that the vehicle is not in the continuous descending state.

3. The control device according to claim 1, wherein during the first braking control, the amount of the regenerative electric power used for the drive of the first motor generator increases as the running speed is higher.

4. The control device according to claim 2, wherein the control device determines whether the vehicle is in the continuous descending state based on a running distance of the hybrid vehicle and a gradient of a downhill road on which the hybrid vehicle is running.

5. The control device according to claim 2, wherein the control device determines whether the vehicle is in the continuous descending state based on the running speed of the hybrid vehicle and a gradient of a downhill road on which the hybrid vehicle is running.

* * * * *